United States Patent
Rogers et al.

(10) Patent No.: US 11,478,837 B2
(45) Date of Patent: Oct. 25, 2022

(54) METHOD AND SYSTEM FOR FABRICATION OF A METAL CUP FOR CREATING AN ANNULAR SEAL WITHIN A WELLBORE

(71) Applicants: Henry E. Rogers, Collinsville, OK (US); Nicolas Rogozinski, Evergreen, CO (US)

(72) Inventors: Henry E. Rogers, Collinsville, OK (US); Nicolas Rogozinski, Evergreen, CO (US)

(*) Notice: Subject to any disclaimer, the term of this patent is extended or adjusted under 35 U.S.C. 154(b) by 513 days.

(21) Appl. No.: 16/284,705

(22) Filed: Feb. 25, 2019

(65) Prior Publication Data
US 2020/0271228 A1   Aug. 27, 2020

(51) Int. Cl.
*B21D 26/047* (2011.01)
*E21B 33/12* (2006.01)
*B21D 26/045* (2011.01)
*F16J 15/08* (2006.01)

(52) U.S. Cl.
CPC ......... *B21D 26/047* (2013.01); *B21D 26/045* (2013.01); *E21B 33/1212* (2013.01); *E21B 2200/01* (2020.05); *F16J 15/08* (2013.01)

(58) Field of Classification Search
CPC .. B21D 26/033; B21D 26/045; B21D 26/047; B21D 15/03; B21D 15/10; F16J 15/08; E21B 33/1212
See application file for complete search history.

(56) References Cited

U.S. PATENT DOCUMENTS

| | | | | |
|---|---|---|---|---|
| 788,119 A | * | 4/1905 | Pope | B21D 26/047 |
| | | | | 72/58 |
| 1,336,738 A | * | 4/1920 | Fletcher | E21B 43/103 |
| | | | | 277/339 |
| 2,631,640 A | * | 3/1953 | Zallea | B21D 15/10 |
| | | | | 72/58 |

(Continued)

FOREIGN PATENT DOCUMENTS

| | | | | |
|---|---|---|---|---|
| DE | 2059812 A1 | * | 6/1972 | ............. B21D 15/10 |
| JP | 61037327 A | * | 2/1986 | ........... B21D 26/033 |

OTHER PUBLICATIONS

Machine Translations of JP 61037327 A, Retrieved from Patent Abstract of Japan May 22, 2021, 5 Pages. (Year: 1986).*

(Continued)

*Primary Examiner* — Gregory D Swiatocha
(74) *Attorney, Agent, or Firm* — Leavitt Eldredge Law Firm

(57) ABSTRACT

A method of fabricating a metal cup includes a tool having an interior profile of a predetermined shape, the tool having a body forming an inner area; placing a metal sleeve within the inner area of the tool; securing the tool in a closed position such that the metal sleeve is unremovable; applying internal pressure within the inner area and within an inside of the sleeve such that the internal pressure exceeds a yield point of a material comprising the metal sleeve, the metal sleeve deforms into the interior profile; opening the body of the tool; and removing the metal sleeve from the tool in the open position; the metal sleeve maintains a deformed shape (Continued)

having an exterior profile that matches the interior profile of the tool.

5 Claims, 4 Drawing Sheets

(56) References Cited

U.S. PATENT DOCUMENTS

| | | | | |
|---|---|---|---|---|
| 3,575,025 | A * | 4/1971 | Tominaga | B21D 15/10 |
| | | | | 72/62 |
| 3,625,440 | A * | 12/1971 | Bond | B03B 9/04 |
| | | | | 241/24.15 |
| 4,557,128 | A * | 12/1985 | Costabile | B21D 26/033 |
| | | | | 29/421.1 |
| 6,176,114 | B1 * | 1/2001 | Gmurowski | B21D 15/10 |
| | | | | 29/421.1 |
| 6,305,204 | B1 * | 10/2001 | Tauzer | B21D 26/033 |
| | | | | 72/62 |

OTHER PUBLICATIONS

Machine translation of DE 2059812, Retrieved from Espacenet Oct. 19, 2021, 5 Pages. (Year: 1972).*

* cited by examiner

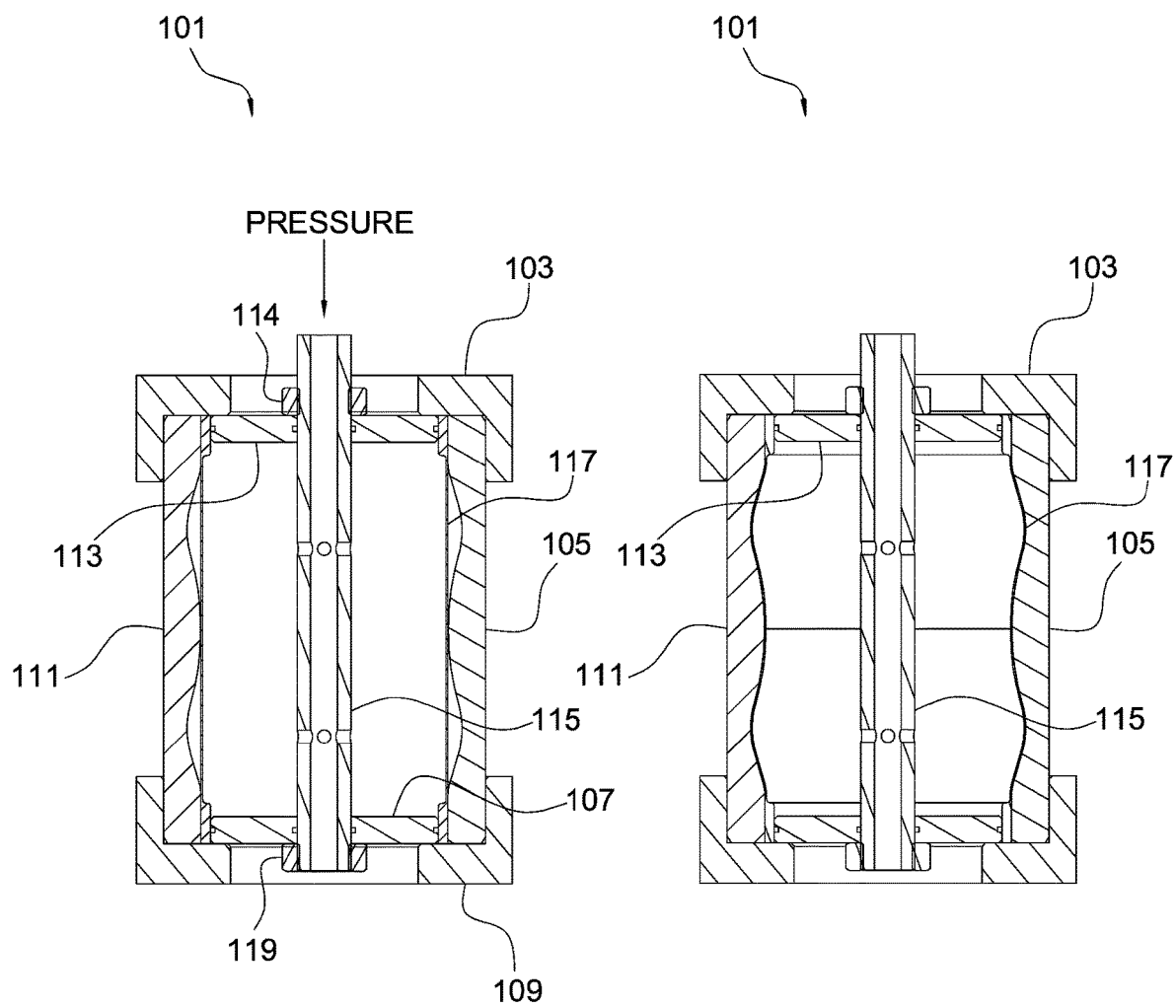

METHOD AND SYSTEM FOR FABRICATION OF A METAL CUP FOR CREATING AN ANNULAR SEAL WITHIN A WELLBORE

BACKGROUND

1. Field of the Invention

The present invention relates generally to systems and methods for creating an annular seal between a casing string and a wellbore, and more specifically to a system and method that utilizes a tool, along with internal pressure, to create a deformed metal sleeve that can be used to create one or more metal shoes for use on a stage packer tool to create the annular seal.

2. Description of Related Art

Well drilling systems are well known in the art and are effective means to collect resources for energy use. This general process is well known in the art and includes a few key elements, including a casing that can be composed of one or more sections that extend within the borehole, the casing providing stability as well as providing locations for various other elements, including blowout preventers, wellhead equipment, production packers, and production tubing.

A packer is a well-known standard component that provides a seal between an outside of production tubing and an inside of the casing liner or wellbore wall. A conventional packer can come in a variety of forms, and conventionally include inflation or compression elements that can be expanded or contracted as necessary to create a seal. However, these tools have downfalls, including cost and insufficient reliability.

Accordingly, it is an object of the present invention to provide a method and system for fabricating an improved annular seal with a metal cup formed from a metal sleeve in a cost-effective manner.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 2A and 2B are side cross-sectional views of the system of FIG. 1 in use;

Figure 1:
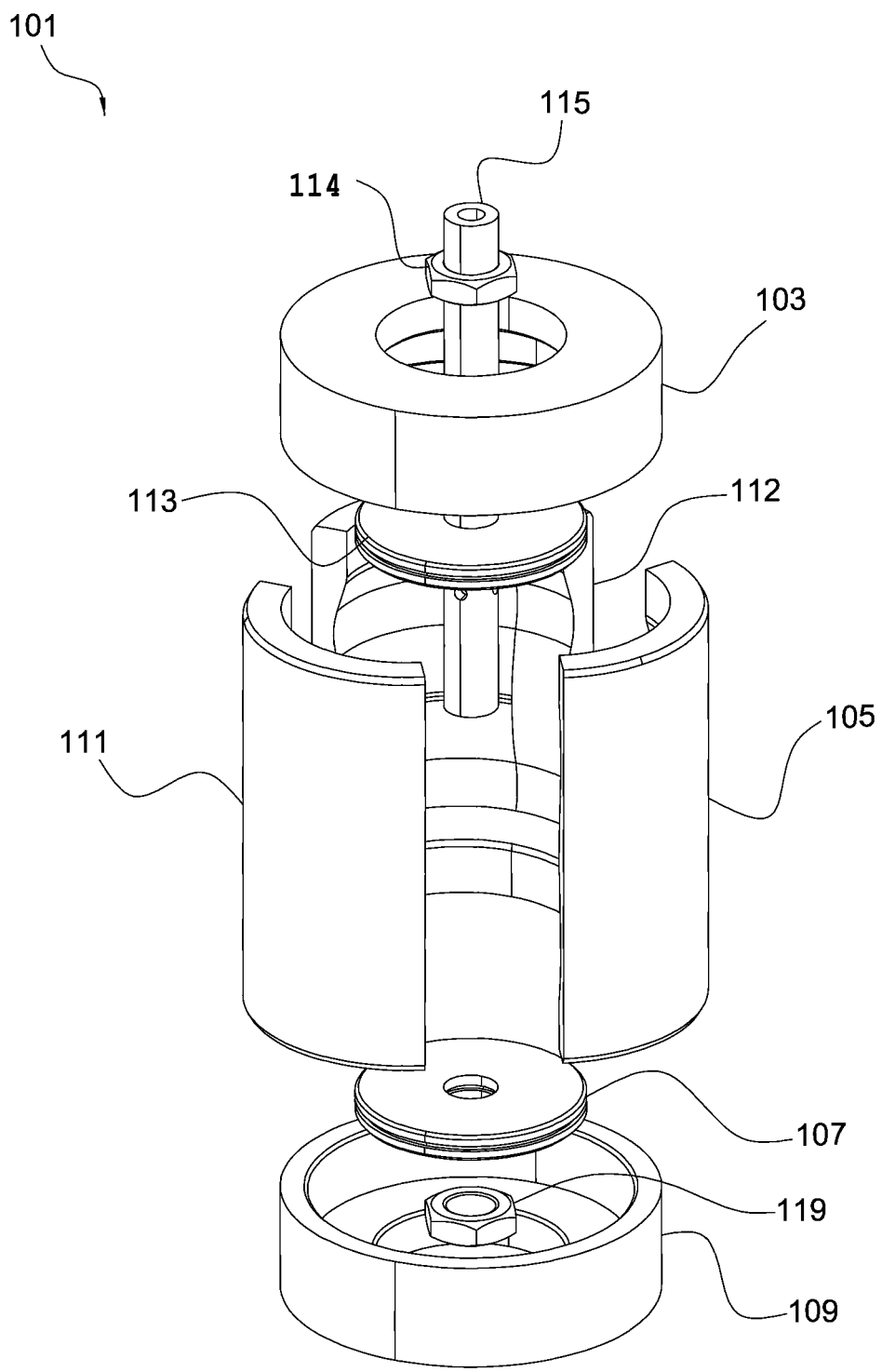
FIG. 1 is an isometric view of a tool for formation of a metal cup formation system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional packers. Specifically, the present invention provides for the formation of one or more metal cups through the application of pressure within a metal sleeve within a tool, thereby forming the one or more durable cups in a cost and time efficient manner. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts an isometric view of a tool 101 for use with a metal cup formation system in accordance with a preferred embodiment of the present application. It will be appreciated that tool 101, along with the associated method, overcomes one or more of the above-listed problems commonly associated with conventional packers and the like. It should be appreciated that the system disclosed herein is utilized as a part of a method, the method being unique to the present application for the creation of the one or more metal cups.

The method of the present invention, as will be discussed in more detail, utilizes a tool to receive and hold a metal sleeve, wherein pressure is applied to an inside of the metal sleeve to deform the sleeve into a desired shape. After the tool is removed, the sleeve can be utilized to create one or more metal cups that can then be used to create one or more annular seals.

As shown in FIG. 1, tool 101 includes a body formed by one or more sides 105, 111, 112 that secure together to form an inner area. The one or more sides include an interior profile of a predetermined shape as desired by the user. It should be appreciated that the predetermined shape can vary as functional considerations require. In addition, although the tool 101 is shown with three sides, it is contemplated that more or fewer sides could be used, so long as the body is segmented for easy removal of the body from the metal sleeve, as will be discussed herein.

The tool 101 further includes a means to secure the one or more sides together. In the preferred embodiment, this means includes an upper end ring 103 and a lower end ring 109 that will secure around the exterior edges of the sides, thereby securing the sides together. The tool can further include first and second end plates 107, 113 that are secured on opposite ends of the sleeve during use. Further, the tool includes threaded nuts 114, 119 to contact the end cap which applies force to plates 113 and 107 when expansion pressure is applied.

In FIGS. 2A and 2B, the implementation of pressure within the tool 101 is shown. As shown, the tool 101, is secured around a metal sleeve 117. As shown in FIG. 2A, the sleeve 117 can start out as a conventional metal tube with an interior area. Upper end ring 103 and lower end ring 109 are positioned to secure the sides 105, 111, 112 together, with the end plates 107, 113 positioned at opposite ends of the sleeve 117. Once the entire tool, with the sleeve secured to the inside, is assembled, pressure is applied through a pressure application device 115, such as a pressure tube, within the sleeve to a level that exceeds the yield point of the sleeve material, thereby forcing the sleeve to take on the predetermined shape and interior profile of the tool. As shown in FIG. 2B, the sleeve 117 has expanded to the interior profile shape.

The tool can then be disassembled (refer to FIG. 1), thereby allowing for the deformed sleeve to be removed.

Figure 3A:
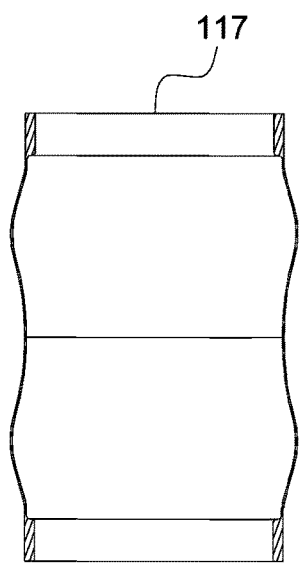
FIGS. 3A-3C are side views of metal cups formed through the system of FIG. 1.
Figure 3B:
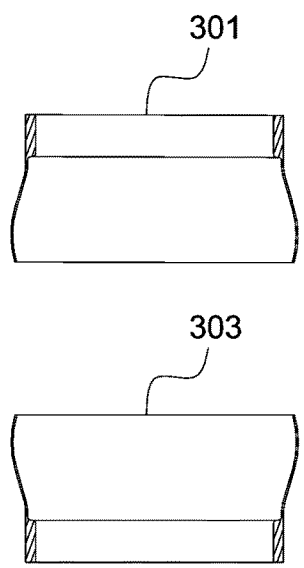
Figure 3C:
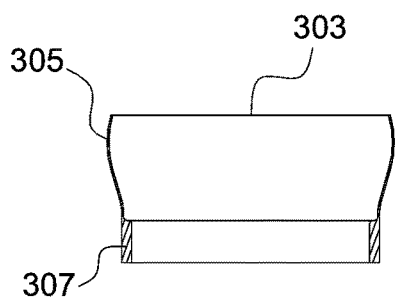

In FIGS. 3A-3C, three stages of the metal sleeve after deformation are shown. in FIG. 3A, sleeve 117 is newly removed from the tool after being shaped as desired. In FIG. 3B, the sleeve is separated into two sections 301, 303, wherein each section can be utilized as a metal cup for creating the annular seal. It should be appreciated and understood that although FIGS. 3A-3C show the metal sleeve being separated into identical cups, the metal sleeve could also be formed into non-identical metal cups as desired and for functional considerations. In FIG. 3C. a single metal cup 303 is shown fully formed. As further shown, it should be appreciated that in some embodiments, the sleeve includes different thicknesses 305, 307, wherein deformation occurs where the sleeve is thin 305.

It should be appreciated that one of the unique features believed characteristic of the present application is the combination of the tool and method of use to create the one or more metal cups through the application of pressure to an inside of a sleeve.

Figure 4:
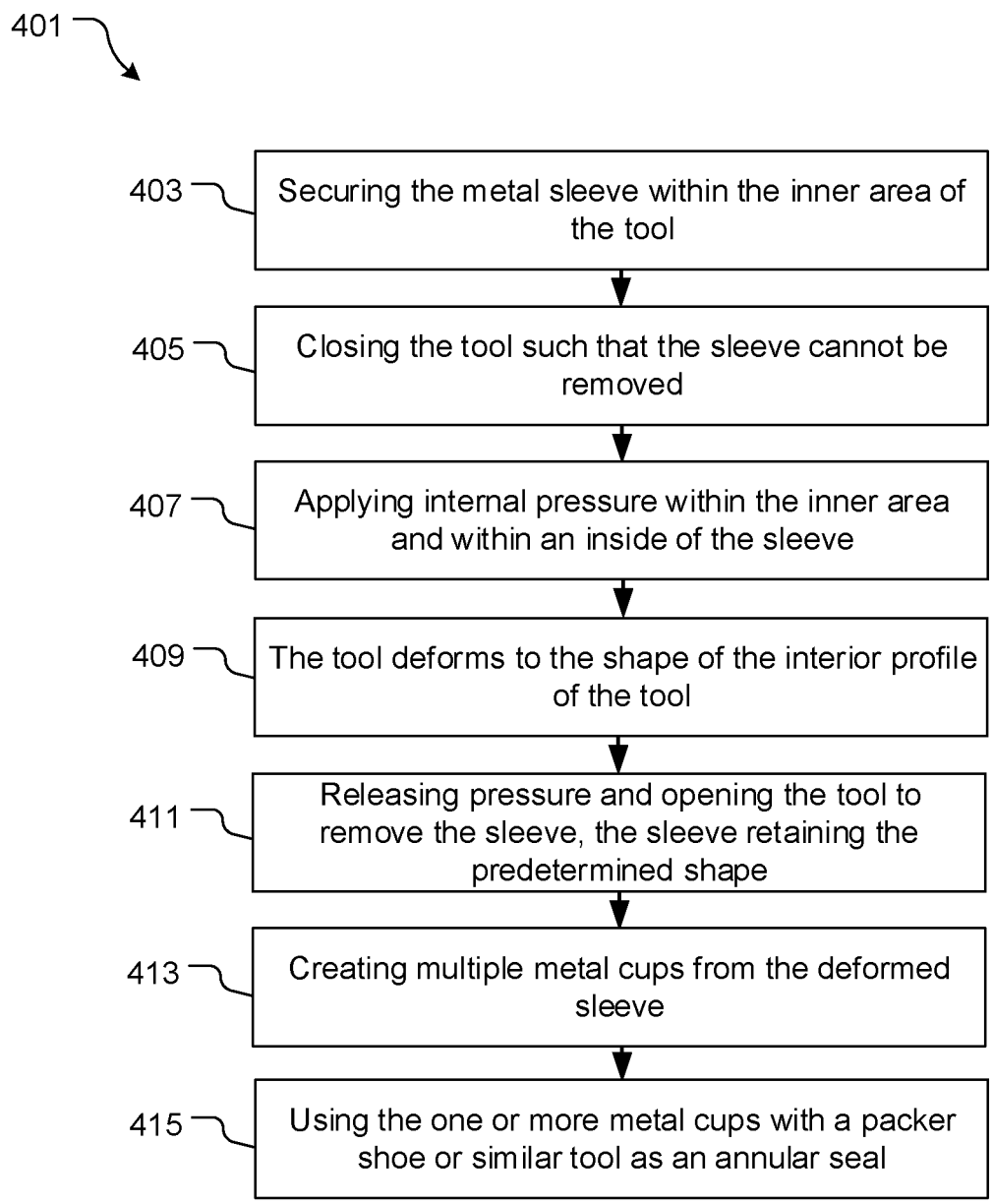
FIG. 4 is a flowchart of the method of use of the system of FIG. 1.

In FIG. 4, a flowchart 401 depicts a method of use of the system and tool discussed herein. During use, the tool is first created that allows for the securement of a metal sleeve within an interior area of the tool, the tool having an internal profile of a predetermined shape, as shown with box 403. The tool is secured around the metal sleeve and internal pressure is applied on the inside of the sleeve to a level that exceeds the yield point of the sleeve material, as shown with boxes 405, 407. As the pressure is applied, the sleeve deforms to the shape of the interior profile, as shown with box 409. Once completed, pressure is released and the tool is opened and the sleeve is removed, the sleeve retaining the deformed shape, as shown with box 411. The deformed metal sleeve can then be used to create multiple metal cups, the metal cups suitable for use with a packer shoe or similar tool as an annular seal, as shown with boxes 413, 415.

It should be appreciated that the invention centers on the method of creating the metal cup that can be used as an annular barrier or seal between a casing string or tool and the wellbore. This metal cup can be configured to have an interference fit within the wellbore wall within an initial contact force. Further, the cup allows for the application of differential pressure across the cup from the open or exposed end when installed into the wellbore. In addition, the metal cup is configured to increase in differential pressure and causes an increase in the contact force the cup places on the wellbore wall. Lastly, the cup provides structural integrity that is robust and durable compared to conventional seals, such as those made from elastomers.

Other benefits of the present invention will be readily understood by those skilled in the art, including: (1) the steel fabrication of the metal cup provides superior wear resistance compared to conventional elastomer cups; (2) the configuration of the metal cup provided initial sealing capability because of its contact force with the formation compared to compression set sealing elements that have pressure holding ability prior to implementing a setting procedure; and (3) the configuration and structural strength of the metal cup allows casing reciprocation or rotation during wellbore conditioning without damaging the cup.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of fabricating a metal cup, the method comprising:
   providing a tool having an interior profile of a predetermined shape, the tool having a body forming an inner area with at least a first side and a second side and having a first end ring and a second ring each surrounding the first side and the second side to secure the first side and the second side together;
   securing a pressure device within the inner area of the tool;
   extending the pressure device an entire length of the inner area;
   placing a metal sleeve within the inner area of the tool and around the pressure device;
   securing the tool in a closed position such that the metal sleeve is secured in a fixed position;
   passing pressurized fluid through an inner channel of the pressure device;
   injecting pressurized fluid into the inner area through a plurality of injectors extending through a thickness of the pressure device and in communication with the inner channel;

applying internal pressure within the inner area and within an inside of the sleeve via the pressure device such that the internal pressure exceeds a yield point of a material comprising the metal sleeve, wherein the metal sleeve deforms into the interior profile;

opening the body of the tool; and removing the metal sleeve from the tool in an open position;

wherein the metal sleeve maintains a deformed shape having an exterior profile that matches the interior profile of the tool.

2. The method of claim 1, further comprising:

placing a first end piece at a first end of the metal sleeve within the inner area of the tool; and placing a second end piece at a second end of the metal sleeve within the inner area of the tool.

3. A system for fabricating a metal cup, the system comprising:

a tool with an interior profile of a predetermined shape, the tool having:
a body formed by at least a first side and a second side;

a metal sleeve to be placed within an inner area of the tool and secured in place by securing the first side and the second side together;

a pressure application device to be inserted into the inner area and within an inside of the sleeve, the pressure application device extending an entire length of the inner area, the pressure application device has a plurality of injectors extending through a thickness of the pressure application device and in fluid communication with an inner channel disposed within the pressure application device;

an upper ring secured to the first end; and a lower ring secured to the second end; wherein the upper and lower rings each surround the first side and the second side wherein internal pressure is applied with the pressure application device within the inner area and within the inside of the sleeve exceeds a yield point of a material comprising the metal sleeve; and wherein the metal sleeve deforms into the interior profile.

4. The system of claim 3, wherein the pressure application device is a pressure tube.

5. The system of claim 3, wherein the tool further comprises:

a first end plate to secure at a first end of the metal sleeve; and a second end plate to secure at a second end of the metal sleeve.

* * * * *